United States Patent [19]

Girdley et al.

[11] Patent Number: 4,910,905
[45] Date of Patent: Mar. 27, 1990

[54] DECOY SYSTEM

[76] Inventors: Gary J. Girdley, P.O. Box 5834, Greenville, Miss. 38701; Melvin W. Girdley, Box 106, Manila, Ark. 72442

[21] Appl. No.: 253,681

[22] Filed: Oct. 5, 1988

[51] Int. Cl.$^4$ .............................................. A01M 31/06
[52] U.S. Cl. .......................................................... 43/3
[58] Field of Search ................................... 43/2, 3

[56] References Cited

U.S. PATENT DOCUMENTS

| | | | |
|---|---|---|---|
| 2,252,795 | 8/1941 | Weems et al. | 43/3 |
| 4,141,167 | 2/1979 | Muehl | 43/2 |
| 4,535,560 | 8/1985 | O'Neil | 43/3 |

*Primary Examiner*—Nicholas P. Godici
*Assistant Examiner*—Michael William Starkweather
*Attorney, Agent, or Firm*—Wigman & Cohen

[57] ABSTRACT

Method and apparatus for animating decoys on a water surface in a manner simulating live waterfowl. An elastic band adapted for retraction by a pulley means enables movement of the waterfowl. A plurality of stake-mounted pulleys disposed in a pattern enables movement of the decoys in an irregular pattern on the water surface. The invention further includes stake insertion/removal means for easy drive/removal of the stakes.

7 Claims, 2 Drawing Sheets

4,910,905

DECOY SYSTEM

BACKGROUND OF THE INVENTION

1. Field of the Invention

This invention relates to decoys and more particularly to a system for dispersing animated waterfowl decoys on a water surface, including means for moving said decoys on the water surface in a realistic manner.

2. Description of the Prior Art

The broad concept of a duck decoy system incorporating a plurality of decoys connected to a flexible line for movable dispersion on a duck pond system is known from U.S. Pat. No. 2,252,795 to Weems et al ('795); U.S. Pat. No. 2,952,090 to Pitenger ('090); U.S. Pat. No. 3,016,647 to Peterson et al ('167); U.S. Pat. No. 4,141,167 to Muehl ('167); U.S. Pat. No. 4,535,560 to O'Neill ('560); and U.S. Pat. No. 4,599,819 to Voges, Jr. et al.

Migratory waterfowl may be lured within gunshot range of hunters by means of a plurality of inanimate decoys placed on a water or duck pond surface. The hunters usually secret themselves in camouflaged hiding places known as duck blinds. Such use of decoys is well known in the art. Also, hunters have long sought to facilitate movement of the waterfowl decoys in order to make such decoys appear more live and realistic.

The Weems et al patents require that rings be tied with knots in a pair elongated rope lines to which decoys are attached. Such knots prevent the passage of the rope through an eyelet or pulley and are usually very difficult to untie on a cold day after the hunt. The decoys are connected directly to the rope line and may be more easily visible to the object waterfowl. While the Weems et al devices utilizes elastic bands to assist manipulation, the decoys are limited to travel in an unrealistic, highly uniform pattern to and away from shore near the duck blind.

The Pittenger patent requires an expensive, elaborate, and complicated mechanical apparatus for a limited number of decoys.

Peterson et al is inherently limited to a pattern of decoys dispersed in a rhombic, or diamond-shaped pattern.

In the Voges, Jr. et al patent, a limited number of ducks are moved back and forth along a straight line by pulling the decoy line against an underwater spring.

The O'Neill reference describes a motorized decoy system in which decoys mounted on a submerged frame are caused to periodically move back and forth, along a straight, elongated line against an elastic band.

Muehl '167 teaches the use of a straight main decoy line and diagonally branching side or "wing" lines, with multiple elastic bands. It is a highly uniform pattern.

These prior art patents do not teach imparting an inherently random-appearing movement of the waterfowl decoys. The decoy systems of the prior art are complex, may also be difficult to set up, may require permanent installation, and/or may be comparatively quite expensive. Animation is generally limited to uniform, regimented patterns.

SUMMARY AND ADVANTAGES OF THE PRESENT INVENTION

According to the present invention, a decoy display system includes a plurality of stakes, preferably T-shaped stakes, which are adapted for implantation in a mud or other relatively soft bottom under water, an elongated flexible line running among the T-stakes, preferably in an irregular pattern, a plurality of decoys flexibly attached to said line and dispersed along the length thereof between said stakes on a water surface, a terminal or anchor stake including an attachment point for fixably attaching an elongated elastic band by one end subjacent the water surface and the other band end to the flexible line, and a retraction mechanism for drawing the flexible line against the elastic line.

More specifically, the retraction means of the present invention includes a reel assembly for retracting the flexible line against the elastic band. In one embodiment, the reel assembly ay be rotatably mounted upon an upper frame element slidably disposed in a telescoping manner into a lower frame element. The bottom of the lower frame element is adapted for easy implantation in a mud bottom or other soft surface.

In an alternative embodiment of the present invention, the pulley frame retraction mechanism also includes a mounting feature for mounting the frame to a vertical surface, such as a wall, tree, or post. The retracting mechanism may be motor driven, as by an electric motor powered by one or more batteries or otherwise, and may further b capable of controlled release of the retraction, as by use of a controllable brake.

It is an advantage of the invention to effectively lure migratory waterfowl within gunshot range of hunters by means of a plurality of inanimate decoys realistically dispersed and animated on a water or a duck pond surface. The decoys may be waterfowl decoys, such as ducks or geese.

The apparatus of the present invention may be set up for use by installing the stakes and retraction mechanism in a predetermined pattern, ending with an anchor stake; stringing a flexible line from the retraction mechanism through the stakes in an irregular pattern producing an irregular array; and terminating the flexible line with a length of elastic line or band material, the end of which is fixed. The decoys may next be dispersed at irregular intervals along at least one portion of the flexible line and attached thereto, preferably with short lengths of flexible line.

Next, the retraction mechanism is operated so as to tension a length of the line against the "stretch" of the elastic band, then the retraction mechanism is released to let the elastic band pull on the other nd of the flexible line. Untensioning the line may be regulated to control the movement of the decoys.

When the retraction means are operated to tension and retract the line, the decoys are pulled in, a first direction along the irregular line path. When the retraction mechanism is released, the decoys are pulled in the opposite direction along the same irregular path. By stringing the line in an irregular appearing pattern and alternately operating and releasing the retraction mechanism, the decoys can be made to move over the surface of the water in a very realistic manner. This may be enhanced by irregularly spacing the decoys. Loosely coupling the decoys to the line, as by short lengths of flexible line, enhances realism as the decoy movements are rarely identical, especially if affected by wind or water currents.

After the hunting period has ended, whether after a short, one-day hunt or after a full season, the decoys are detached from the line, the stakes are easily located by following and raising the line to trace their location, and the stakes are lifted to remove them from the pond bottom. A special tool, adapted for removable attachment to the stake tops may be used to facilitate implanting the stakes on the pond bottom, and is also useful in the removal of the stakes from the pond bottom after the hunt. Removing the stakes reduces hazards to boaters, swimmers, and others.

It is intended in the following description that the present invention be used on a wide variety of water surface configurations; it is recognized that the usual terms for describing the appropriate bodies of water may be inherently limiting in their definitions. Therefore, as used herein, the term "pond" will be used to describe any body of water suitable for dispersion of decoys, wherein the body of water has a top surface, a bottom, and at least one side, which may be curvilinear. The bottom, perhaps most often mud or soft soil, may also exist in a number of other forms such as rocks or stones without departing from the uses contemplated with the present invention.

BRIEF DESCRIPTION OF THE DRAWINGS

The invention is illustrated in the accompanying drawings, in which the same reference characters indicate the same parts in all views in which.

DETAILED DESCRIPTION OF THE INVENTION

Figure 1:
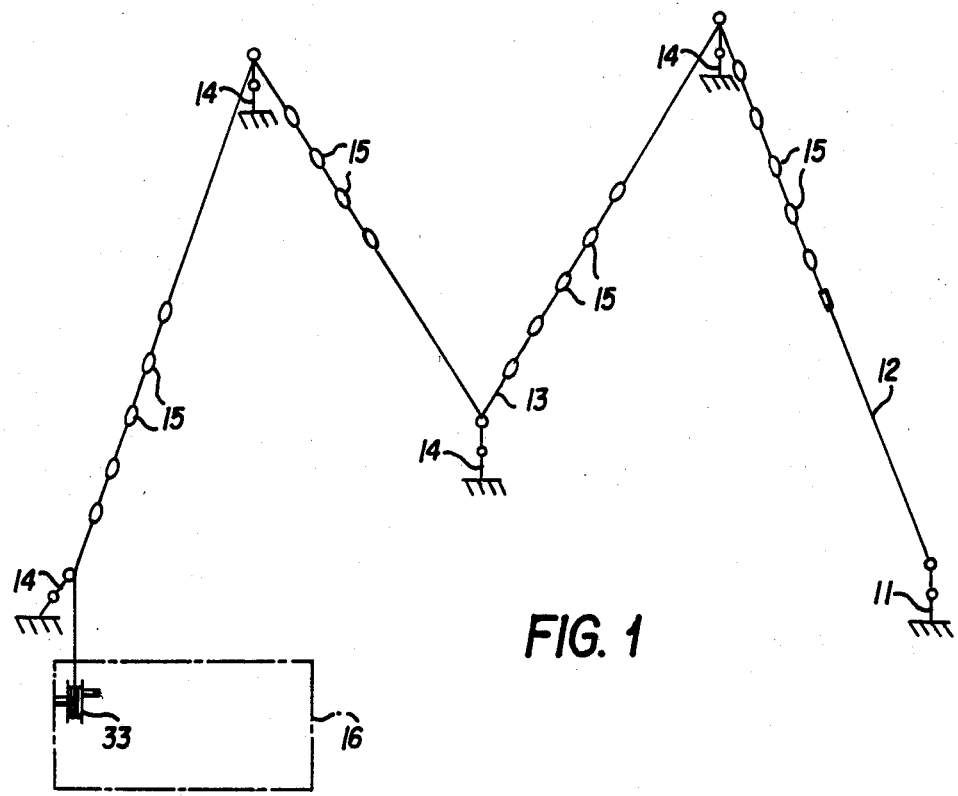
FIG. 1 is a plan view of a pond showing the installation of the elements of the present invention.

Referring now to the drawings, FIG. 1 illustrates in plan view the layout of the elements of the present decoy system 10 for use on a body of water, which view is supplemented by FIGS. 2-5. From a fixed anchor point 11, which is preferably a generally vertical anchor stake implanted subjacent he pond surface, an elongated elastic band 12 is extended below the pond surface to join an elongated flexible line 13, which may, for example, be any suitable smaller diameter cord resistant to the harmful effects of water immersion.

At the extreme end of flexible line 13 is a line retraction mechanism which may, for example, be a rotatable drum having a handle to facilitate rotation thereof in the manner of a winch. Retraction mechanism 16 is more clearly shown in FIGS. 3 and 5. The flexible line is attached to the retraction mechanism such that when the retraction mechanism is operated, the line is wound around the drum in a conventional drum and cable manner.

A plurality of generally vertical stakes 14 are implanted in the pond bottom. Each stake includes an aperture near its uppermost portion, adapted for passage of the flexible line therethrough. In a preferred embodiment, to be discussed hereinafter in more detail, the aperture function is fulfilled by a pulley mechanism which may be flexibly connected to a top portion of stake 14, as with a swivel joint of the type known to those similar with fishing, sailing, and other outdoor sports. In this manner, the flexible line may be routed among a plurality of stakes 14 in a random appearing fashion. The stakes may be arranged in either a regular or irregular pattern. For the present disclosure, it is preferred that the vertical stakes have a top portion which is submersible to enhance the decoy movement realism by placing the visible portion of the system well under water. A plurality of decoys 15 are flexibly attached to and dispersed along the path of a flexible line, preferably between the vertical stakes. The decoys may be grouped singly, in small numbers, or as limited by the distance between the stakes.

In operation, the retracting mechanism 16 is operated to accumulate and store (or an equivalent operation) a portion of the flexible line 13 nearest the retracting mechanism. As the line is retracted in this first direction, the elastic band 12 is stretched from anchor 11. The decoys 15, attached to the flexible line, are moved generally along the path of the line in a pattern determined by the configuration of the stakes. When the elastic band 12 has been stretched so as to move the ducks close to the intervening stakes in the first direction, the retracting mechanism is released to permit travel of the flexible line 13 in the opposite direction, pulled along by the elasticity of the elastic band 12 until the tension is relieved. The decoys are thus reversed and directed in the second direction until the flexible line is slackened. The forward-reverse operation of the retraction mechanism, in combination with an irregular longitudinal path pattern, gives the decoys a very realistic appearing movement on the pond surface. Audible attraction methods, not part of the invention, may be utilized to complete the realism of the decoy system operation.

Figure 2:
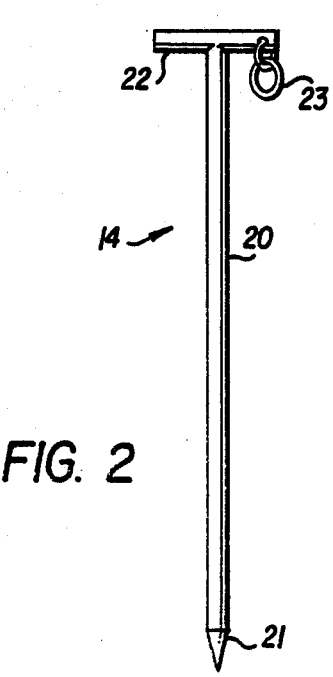
FIG. 2 is an elevation view of the stakes used in connection with the present invention.

A preferred form of the vertical stakes 14 is shown in FIG. 2. In this preferred form, the stake 14 comprises an elongated shaft 20 portion, which may be made of wood, fiberglass or preferably metal, such as aluminum, and includes a sharpened point 21 at the lowermost end to facilitate implantation in the pond bottom. An aperture is provided for passage of the elongated line; in this preferred embodiment, a pulley 23 is loosely but securely fastened to the top of stake 14. For the example of this preferred embodiment, a cross-bar 22 is secured to the top of the shaft 20 and the pulley 23 isattached by ordinary fasteners. A conventional swivel pulley is preferably employed, however, a non-swivel type pulley can also be used. A swivel device permits free movement of the pulley 23. If desired, a stake 14 with or without the pulley 23 may serve as an anchor 11.

The preferred retraction mechanism incorporates a number of features, including flexible mounting, easy dismounting, a simple drum type winch mechanism, and a frame which facilitates vertical adjustment to maintain the winding mechanism above the water surface. Movement of the water surface adjacent the retraction mechanism by operation thereof could inappropriately direct the object's attention from the decoys so the retraction mechanism should be above the water surface. Elevation also permits locating the mechanism at an optimum eight for hunter comfort.

Figure 3:
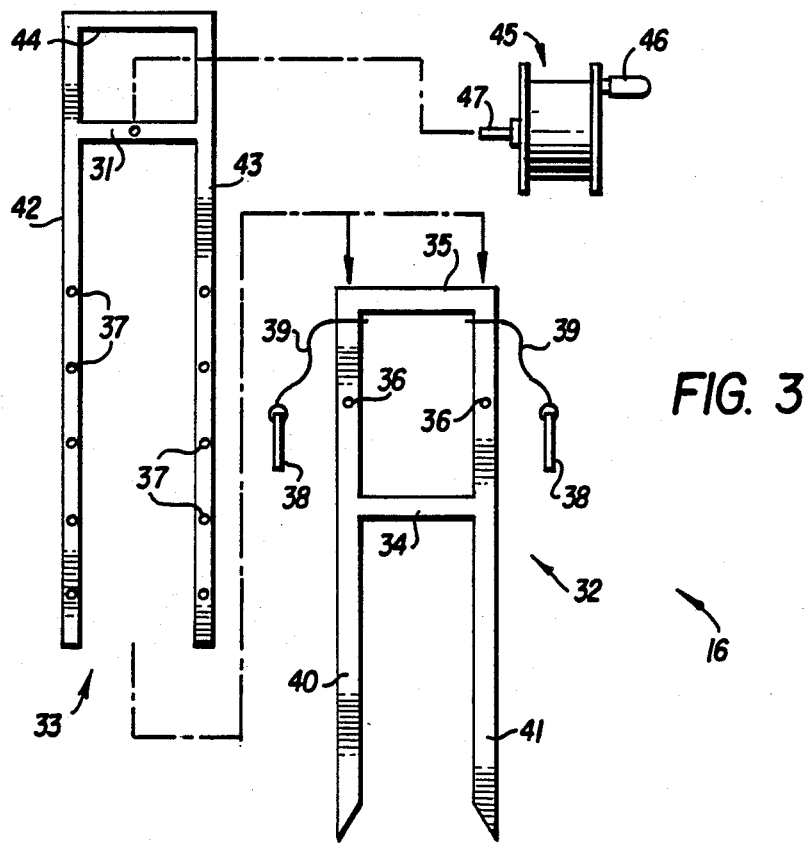
FIG. 3 is an elevation view of the retraction mechanism and frame assembly of the present invention.
Figure 5:
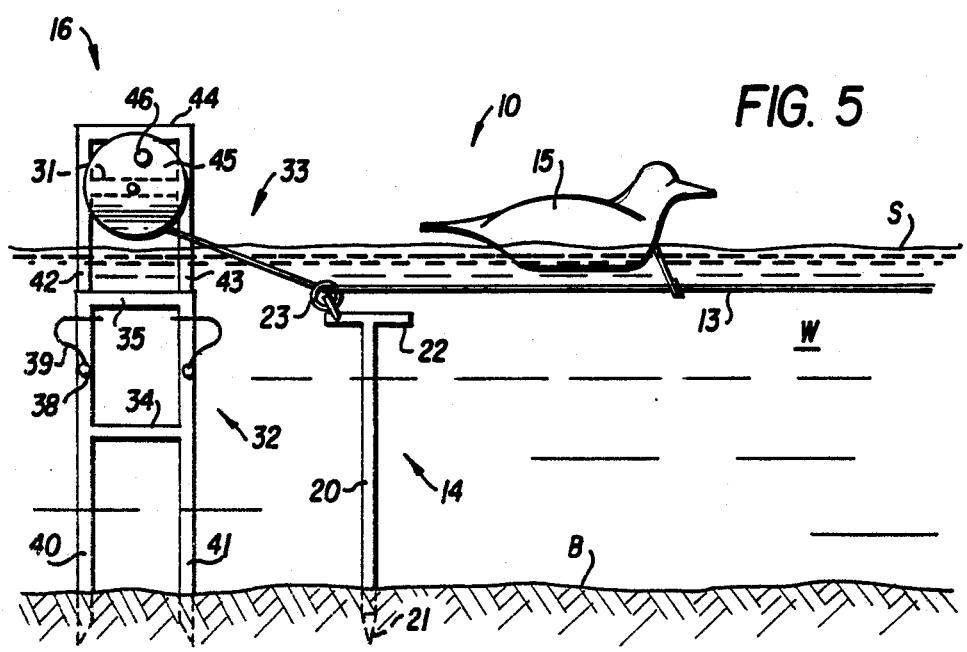
FIG. 5 is an elevation view showing the retraction mechanism frame installed and connected to the end of a flexible string.

In the preferred embodiment shown in FIGS. 3 and 5, the retraction mechanism 16 is configured as a two-part frame 32 and subframe 33 to which pulley/drum 45 is rotatably mounted via an axial 47. The drum maybe of any convenient dimension appropriate to the purpose; a range of 6 to 12 inches in diameter is suitable with about 9 inches preferred; and a width of two to four inches, preferably about 3 inches, is preferred. Axle 47 may include bearings and/or bushings to facilitate rotation. A handle 46 is shown for operator cranking to winch the flexible line in and for controlling the release of the flexible line out. For the present illustrative embodiment, a retraction mechanism is shown with a horizontal axis. Alternatively, other axes and/or other retraction mechanism configurations may be employed, and such may be power driven. Brake means may also be employed to limit the speed of the retraction means (in either direction) without departing from the scope of the appended claims. Here, the bottom frame 32 includes a pair of generally vertically disposed elongated side members 40, 41 preferably having sharpened ends, and joined by top and intermediate braces 35, 34 along the length of the side members 40, 41 in a rectilinear configuration. In this embodiment, the lower brace may serve as a step to facilitate implantation in the pond bottom. Top brace 35 facilitates removal. The bottom frame 32 may be made of the same materials as the stakes if desired.

In the preferred embodiment shown, top frame 33 also includes a pair of generally vertically disposed elongated side members 42, 43 joined by top and intermediate braces 42, 31 along the length of side members 42, 43. Spaced along the length of each side member 42, 43 are a plurality of holes 37 generally matching and mating with the holes 36 and bottom frame 32. The side members of the frame pieces 32, 33 are preferably hollow and sized to permit free telescoping movement of upper frame 33 in bottom frame 32, or vice-versa. They may be of similar material. Drum 46 may be rotatably attached via axial 47 to the lower cross bar 31 of upper frame 33. Alternative configurations which are functionally equivalent are embraced within the scope of the appended claims.

In use, top frame 33 is inserted in bottom frame 32, the bottom frame is implanted in the pond bottom, an upper frame 33 is telescopingly adjusted within bottom frame 32 to provide he desired height location for pulley/drum 45 and handle 46.

Disposed along the length of side members 40, 41 are at least one and preferably two holes 36 through which a pin 38 may be inserted. Two pins are preferred; they may be loosely fastened to frame 32 as by a flexible lanyard means 39.

The retraction mechanism 16 is installed above the water surface in a pond, as shown in FIG. 5. Alternatively, retraction mechanism 16 may be mounted via one or more holes 37 (FIG. 3) to any convenient generally vertical surface. In FIG. 5, W represents the pond water, and B and S represent the pond bottom and surface, respectively.

Stake 14 is shown with its shank buried via pointed end 21 in the pond bottom B. The top-most portions of stake 14 include cross bar 22 to which is secured pulley 23. Elongated flexible line 13 is threaded through pulley 23 between the string of decoys (not shown) and the retraction mechanism 17. The flexible line 13 extends through the water surface S in its transition from pulley 23 to retraction mechanism 17, in FIG. 5.

While not always the case, retraction mechanism 16 and lower frame 32 is shown with its side members 40, 41 buried fully to the step or cross brace 34. Upper frame 33 is spaced above the water surface S by telescoping with lower frame 32; the object being to locate the winding portion of retraction mechanism 16 above water in a convenient position for the hunter. Upper frame 33 is shown secured to lower frame 32 by a pin 38 hanging from frame 32 on lanyard 39, and is inserted through matching alignment holes 36 and 37. The upper frame brace 31 supports pulley/drum 45 by axle 47. Top brace 44 helps maintain rectilinear alignment of side members 42, 43 for easy telescoping in lower frame 32. Handle 45 facilitates winding and unwinding of line 13 around pulley/drum 45 for retraction of the flexible line.

Figure 4:
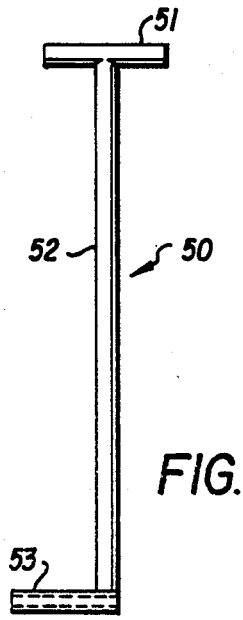
FIG. 4 is an elevation view of the stake puller.

FIG. 4 illustrates a useful stake puller tool 50 which may advantageously be employed to install, and especially to remove, the vertical stakes 14, including anchor stake 11. Puller 50 includes an elongated shaft 52 to which is attached at one end a handle 51 and a stake handle mating element or gripper 53 at the opposite end. Gripper 53 should preferably be hollow and generally but loosely conform on its interior surfaces to the exterior surfaces of the stake 14 cross bar or handle 22. In use, the stake 14 handle 22 portion not securing pulley 23 may be inserted in gripper 53 and then stake 14 is pressed into the pond bottom. The elongated line may be run through pulley 23 before or after implanting stake 14 in the pond bottom; in any case, the pulley may be easily located when puller 50 is hooked onto stake 14 because the pulley is attached to stake 14 cross bar 22 opposite gripper 53. For removal of stakes 14 from the pond bottom, the flexible line 13 is traced from stake to stake, and stake handle 22 is located by reference to he line position. Gripper 53 is placed over handle 22, which may be more precisely located by hand or by sight, and tee puller 50 lifted upwards.

Decoys 15 of FIG. 1 may be attached to flexible line 13 by conventional methods. One method commonly known to waterfowl hunters is the use of a pair of swivel hook snaps on opposite ends of short flexible line such as a fishing leader (which may be clear or opaque in visibility in water); one end is collected to the decoy 15 and the other end to line 13. Variations in leader line length may produce variations in decoy response to movement of the main flexible line.

To set up and operate the present decoy system on a water surface, first implant a plurality of generally vertical stakes with their tops subjacent the water surface, the stakes having at their top ends apertures for passing the flexible line therethrough. Next, implant a generally vertical anchor stake below the water surface beyond the desired and of decoy travel. The anchor stake should be displaced far enough beyond expected decoy travel to accommodate expansion o the elastic band. A line retraction mechanism is then mounted to a fixed point, preferably above the water surface, at the opposite end of the decoy string. A flexible line is attached at its first end to the retraction mechanism, and its second end is routed from the retraction mechanism through each of the stake apertures in the desired pattern of travel. The first end of an elongated elastic band is secured to the anchor stake which may be below the water surface, and the free end of the flexible line and the free end of the elastic band connected one to the other. A plurality of decoys may be attached to the elongated flexible line, preferably by short flexible lines which may be invisible if desired. These decoys may be attached to the flexible line between installation of the individual stakes if desired. The retraction means are then operated so as to retract a portion of the line to stretch and tension the elastic band. Next, the retraction means are released (the retraction means ma be controllably released, as by breaking). In this manner, the decoys may be towed along an elongated path from the first predetermined elongated path in a first direction which direction is reversed upon release of the retraction mechanism. It should be noted that by maintaining as many of the stakes and as much of the flexible line and elastic band apparatus below the water surface, few component parts of the decoy systems will be visible from above. It is also noted that in ordinary use, it may be preferable to remove the line and stakes each time the day's hunt is completed; this is especially true in waterways on which canoes or boats may travel. By avoiding knots and/or permanent metal rings in theflexible line, the line may be used without degradation of system operations.

Finally, it should be noted that the retraction means may be implanted via lower frame 32 on the bottom of the pond, or may alternatively be mounted to a generally vertical element such as a duck blind wall by holes 37. It is preferable that the retraction means be mounted in a position comfortable for the hunter, or other person operating the retraction means during the hunting period.

Although only preferred embodiments are specifically illustrated and described herein, it will be appreciated that many modifications and variations of the present invention are possible in light of the above teachings and within the purview of the appended claims without departing from the spirit and intended scope of the invention.

What I claimed is:

1. A method for dispersing a plurality of decoys on a water surface, comprising the steps of:
    (a) mounting a mechanical line retraction mechanism to a point above the water surface;
    (b) implanting a generally vertical anchor stake subjacent the water surface;
    (c) implanting a plurality of generally vertical intervening line guide stakes subjacent the water surface to form an irregular non-linear pattern, each of said line guide stakes including apertures for passing a line freely therethrough, whereby the decoys on adjacent portions of the pattern move in generally opposite directions;
    (d) attaching a flexible line at one end to the retraction mechanism;
    (e) routing the flexible line from said retraction mechanism through said line guide stake apertures to produce an irregular pattern among said line guide stakes;
    (f) securing a first end of an elongated elastic band to said anchor stake subjacent the water surface;
    (g) securing the free end of said flexible line to said elastic band; and
    (h) flexibly attaching the decoys to said flexible line,
    (i) operating the mechanical line retraction mechanism to retract a portion of the line and thereby stretch the elastic band, and then releasing the elastic band.

2. The method of claim 1, wherein the retracted elastic band is controllably released.

3. The method of claim 1, wherein the line guide stakes are removably implanted.

4. The method of claim 1, wherein the mechanical line retraction mechanism includes frame means adapted for mounting to a pond bottom, further including the step of mounting said mechanical line retraction frame means to the pond bottom.

5. The method of claim 1, wherein the mechanical line retraction mechanism is adapted for mounting to a fixed, vertical element, further including the step of mounting said mechanical line retraction mechanism to the fixed, vertical element.

6. The method of claim 5, wherein the mechanical line retraction mechanism is adjustable in elevation above the pond bottom, the step of adjusting the elevation of the mechanical line retraction mechanism suprajacent the water surface.

7. The method of claim 1, wherein the flexible line is routed among the line guide stakes as each line guide stake is implanted.

* * * * *